US009697083B2

(12) United States Patent
Anglin et al.

(10) Patent No.: US 9,697,083 B2
(45) Date of Patent: *Jul. 4, 2017

(54) USING GEOGRAPHICAL LOCATION INFORMATION TO PROVISION MULTIPLE TARGET STORAGES FOR A SOURCE DEVICE

(71) Applicant: International Business Machines Corporation, Armonk, NY (US)

(72) Inventors: Matthew J. Anglin, Tucson, AZ (US); David M. Cannon, Tucson, AZ (US); Colin S. Dawson, Tucson, AZ (US); Howard N. Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 14/550,348

(22) Filed: Nov. 21, 2014

(65) Prior Publication Data

US 2016/0147608 A1 May 26, 2016

(51) Int. Cl.
*G06F 11/14* (2006.01)
*G06F 11/20* (2006.01)
(Continued)

(52) U.S. Cl.
CPC ...... *G06F 11/1435* (2013.01); *G06F 11/1451* (2013.01); *G06F 11/1464* (2013.01);
(Continued)

(58) Field of Classification Search
CPC ............. G06F 11/1451; G06F 11/1469; G06F 11/1464; G06F 11/1448; G06F 17/30241;
(Continued)

(56) References Cited

U.S. PATENT DOCUMENTS 7,107,274 B2 * 9/2006 Sekiguchi ........... H04L 67/1097
707/781
7,380,078 B2 * 5/2008 Ikegaya .............. G06F 11/2069
709/224

(Continued)

OTHER PUBLICATIONS

Office Action, dated Aug. 26, 2016, for U.S. Appl. No. 14/828,123, filed Aug. 17, 2015, invented by Matthew J. Anglin et al., Total 20 pages.

(Continued)

*Primary Examiner* — Prasith Thammavong
*Assistant Examiner* — Alex Olson
(74) *Attorney, Agent, or Firm* — David W. Victor; Konrad, Raynes, Davda and Victor LLP

(57) ABSTRACT

Provided are a computer program product, system, and method for using geographical location information to provision multiple target storages for a source device. A determination is made of a geographical location of the source device and a distance between the source device and each of the target storages and between each pair of target storages. A determination is further made of qualifying k-tuples of the target storages, wherein each k-tuple comprises a group of k target storages to which the source data is to be backed-up. A qualifying k-tuple has one target storage that satisfies a distance requirement with respect to the source device and a distance between any two target storages in the k-tuple satisfies the distance requirement. A selected qualifying k-tuple is indicated to use to backup the source data at the k target storages in the qualifying k-tuple.

22 Claims, 9 Drawing Sheets

(51) Int. Cl.
*G06F 17/30* (2006.01)
*H04L 12/26* (2006.01)
*H04L 12/24* (2006.01)

(52) U.S. Cl.
CPC ...... *G06F 11/2058* (2013.01); *G06F 11/2069* (2013.01); *G06F 17/30241* (2013.01); *G06F 17/30345* (2013.01); *H04L 41/12* (2013.01); *H04L 43/0888* (2013.01); *H04L 43/16* (2013.01); *G06F 2201/80* (2013.01); *G06F 2201/84* (2013.01)

(58) Field of Classification Search
CPC ... G06F 2201/84; G06F 11/1458; G06F 3/067
See application file for complete search history.

(56) References Cited

U.S. PATENT DOCUMENTS

| | | | |
|---|---|---|---|
| 7,467,267 B1 | 12/2008 | Mayock | |
| 7,539,708 B2* | 5/2009 | Oosaki | G06F 11/1458 |
| 7,643,835 B1* | 1/2010 | Nosack | H04W 4/02 455/41.3 |
| 7,934,116 B2* | 4/2011 | Mehrdad | G06Q 10/10 707/652 |
| 8,140,791 B1* | 3/2012 | Greene | G06F 11/1464 711/162 |
| 9,245,241 B2 | 1/2016 | Kite et al. | |
| 2004/0205152 A1* | 10/2004 | Yasuda | G06F 17/30212 709/217 |
| 2005/0135257 A1 | 6/2005 | Stephens et al. | |
| 2005/0251635 A1* | 11/2005 | Yoshinari | G06F 11/1464 711/162 |
| 2009/0276771 A1 | 11/2009 | Nickolov et al. | |
| 2010/0005258 A1* | 1/2010 | Westenberg | G06F 11/1466 711/162 |
| 2012/0233308 A1 | 9/2012 | Van De Houten et al. | |
| 2012/0242501 A1 | 9/2012 | Tran et al. | |
| 2013/0080703 A1* | 3/2013 | Kumagai | G06F 9/5072 711/117 |

OTHER PUBLICATIONS

Response to Office Action, dated Nov. 28, 2016, for U.S. Appl. No. 14/828,123, filed Aug. 17, 2015, invented by Matthew J. Anglin et al., Total 5 pages.
Notice of Allowance, dated Dec. 23, 2016, for U.S. Appl. No. 14/828,123, filed Aug. 17, 2015, invented by Matthew J. Anglin et al., Total 9 pages.
Office Action, dated Jan. 12, 2017, for U.S. Appl. No. 14/550,376, filed Nov. 21, 2014, invented by Matthew J. Anglin et al., Total 26 pages.
List of Patents or Patent Applications Treated As Related (Appendix P), Nov. 21, 2014, for U.S. Appl. No. 14/550,376, filed Nov. 21, 2014 by M.J. et al., Total 2 pp.
US Patent Application, dated Aug. 17, 2015, for U.S. Appl. No. 14/828,123, filed Aug. 17, 2015, invented by Matthew J. Anglin et al., Total 38 pages.
Preliminary Amendment, dated Aug. 17, 2015, for U.S. Appl. No. 14/828,123, filed Aug. 17, 2015, invented by Matthew J. Anglin et al., Total 7 pages.
US Patent Application, dated Aug. 12, 2015, for U.S. Appl. No. 14/824,991, filed Aug. 12, 2015, invented by Matthew J. Anglin et al., Total 37 pages.
Preliminary Amendment, dated Aug. 12, 2015, for U.S. Appl. No. 14/824,991, filed Aug. 12, 2015, invented by Matthew J. Anglin et al., Total 7 pages.
Preliminary Amendment, dated Aug. 12, 2015, for U.S. Appl. No. 14/550,376, filed Nov. 21, 2014, invented by Matthew J. Anglin et al., Total 8 pages.
List of Related Applications, pp. 2, dated Aug. 17, 2015.

* cited by examiner

Data Store Entry

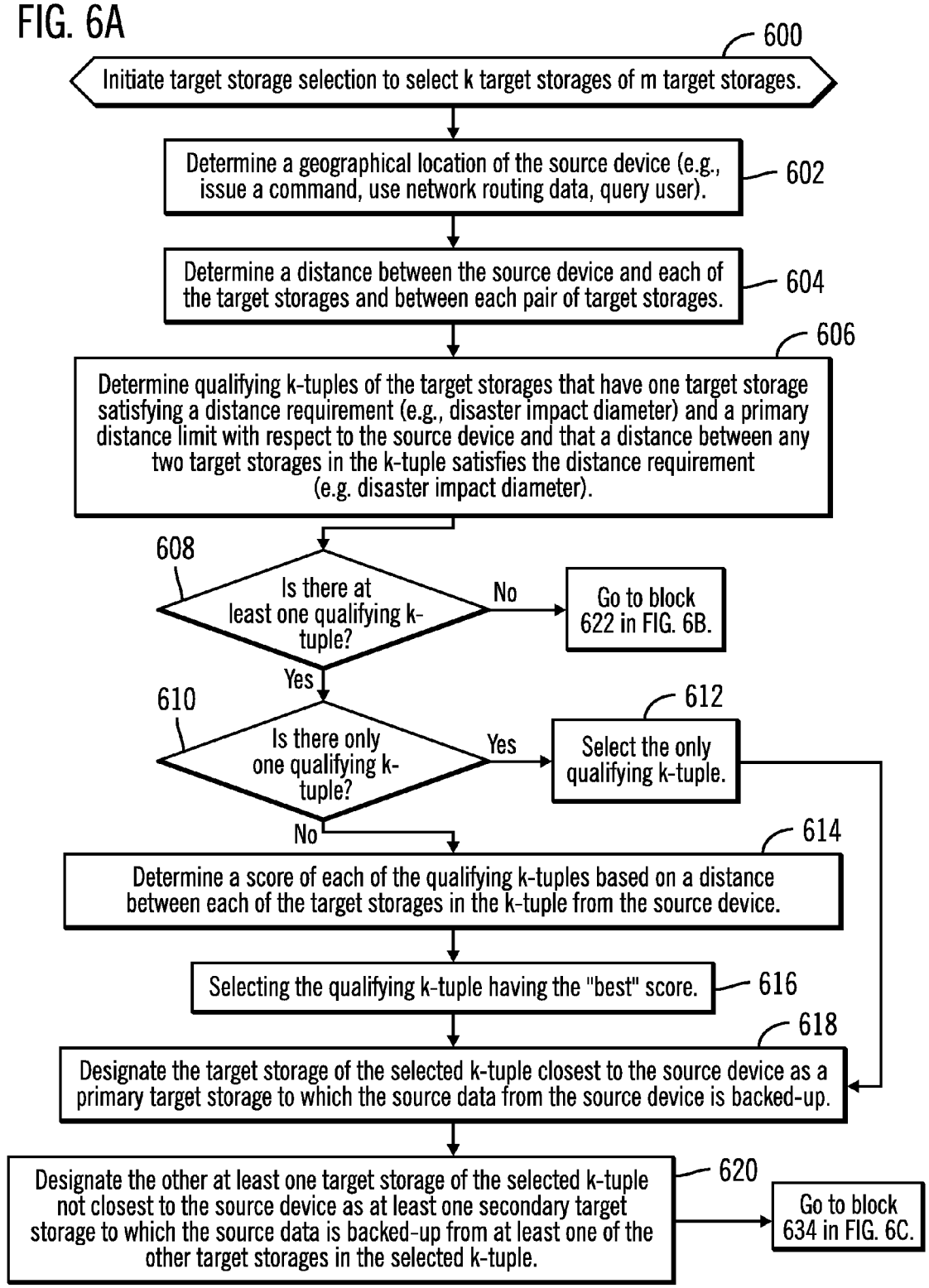

USING GEOGRAPHICAL LOCATION INFORMATION TO PROVISION MULTIPLE TARGET STORAGES FOR A SOURCE DEVICE

BACKGROUND OF THE INVENTION

1. Field of the Invention

The present invention relates to a computer program product, system, and method for using geographical location information to provision multiple target storages for a source device.

2. Description of the Related Art

In network computing environments, an administrator will typically provision backup storage devices to backup data from the source devices in the network. The administrator may select one or more backup or target storages to receive the source device data. Selection of a data protection solution for storage devices generally depends on arbitrary decisions or heuristics for selecting a data protection target. For example, all application servers supporting an organization might be backed up to the same centrally located data-protection server, even though the protected application servers are geographically dispersed. Such an approach may result in operational inefficiency and/or inadequate disaster protection, especially in complex environments with dispersed data assets.

Further, in many customer environments, the location of the client data is in close proximity to the location of the data protection server to which the data is being sent. In such configurations, if a disaster were to befall the location of the backup and source data, then all copies of the data may be lost. To guard against such occurrences, many customers make off-site copies of data, or use replication technologies (such as IBM® Tivoli® Storage Manager Node Replication) to make a disaster recovery copy. (IBM and Tivoli are registered trademarks of International Business Machines Corporation throughout the world)

There is a need in the art for improved techniques for provisioning storage resources to client data for data protection and backup.

SUMMARY

Provided are a computer program product, system, and method for using geographical location information to provision multiple target storages for a source device. A determination is made of a geographical location of the source device and a distance between the source device and each of the target storages and between each pair of target storages. A determination is further made of qualifying k-tuples of the target storages, wherein each k-tuple comprises a group of k target storages to which the source data is to be backed-up. k is an integer value greater than or equal to two and less than or equal to m. A qualifying k-tuple has one target storage that satisfies a distance requirement with respect to the source device and a distance between any two target storages in the k-tuple satisfies the distance requirement. Selection is made of one of the qualifying k-tuples. The selected qualifying k-tuple is indicated to use to backup the source data at the k target storages in the qualifying k-tuple.

BRIEF DESCRIPTION OF THE DRAWINGS

FIGS. 6a, 6b, and 6c illustrate an embodiment of operations to select a plurality of target storages to backup source data from a source device.

DETAILED DESCRIPTION

In order to optimize the data protection location of backup sites, the location of the data must be considered. However, a data protection solution may involve contradictory location-related considerations. For example, data protection and recovery operations are typically most efficient when data sources (the data to be protected) are close to data-protection targets (the servers/storage on which backed-up data is protected), thereby minimizing data transfer time and consumption of network resources. On the other hand, disaster recovery requirements dictate that these sources and targets be as far apart as possible (or at least that there be some required geographic separation) to allow for data recovery even if there is a disaster at one of the locations. A technique is needed for optimizing a data protection solution based on such opposing location considerations.

Described embodiments provide techniques for selecting target storages for a source device that considers the location of the target storages and source devices and determines one of the target storages whose distance from the source device based on the geographical locations of the source device and the target storages satisfies at least one distance requirement. In certain implementations, multiple distance requirements, such as disaster impact diameters and a primary distance limit for a source device may be considered. Described embodiments further allow for the automatic initiation of a configuration procedure to configure the source device and the determined target storage to backup the source data from the source device to the target storage over the network. In this way, described embodiments provide for automated, explicit consideration of geographic factors to ensure that data-protection solutions are operationally efficient and compliant with disaster recovery requirements.

Another technical problem in the prior art is how to select the locations of multiple target storages to backup and protect data for a source device when there are multiple distance requirements, such as disaster impact diameters and a primary distance limit for the server with respect to a primary target storage to which daily backups and recoveries may be performed.

Figure 1:
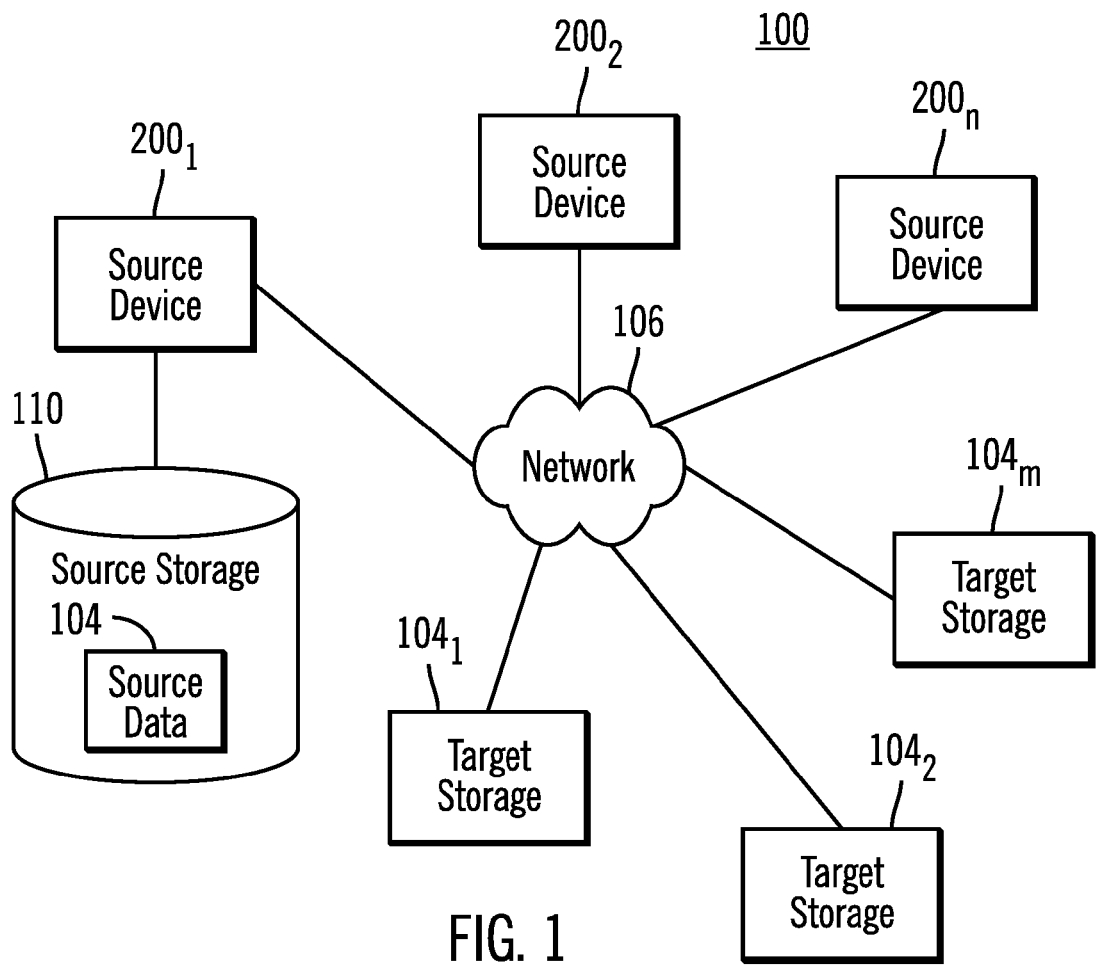
FIG. 1 illustrates an embodiment of a backup storage environment.

Described embodiments provide techniques for selecting multiple target storages to use to backup data for a source device by determining a distance between the source device and each of the target storages in the network and between each pair of target storages. A determination is then made of qualifying k-tuples of the target storages. A k-tuple comprises a group of k target storages. In one embodiment, the k-tuple may comprise an ordered or unordered list of k target storages to which the source data is to be backed-up, such that k is an integer value greater than or equal to two and less than or equal to m. In other embodiments, the k-tuples may comprise other groups of target storages. A qualifying k-tuple has one target storage that satisfies a distance requirement with respect to the source device and a distance between any two target storages in the k-tuple satisfies the distance requirement. The qualifying k-tuple are then used to backup the data for the source device FIG. 1 illustrates an embodiment of a network storage environment 100 having one or more source devices $200_1$, $200_2$ ... $200_n$ and a plurality of target storages $104_1$, $104_2$ ... $104_m$ that communicate over a network 106. Each source device $200_1$, $200_2$ ... $200_n$ has source data 108 in a source storage 110 that may backed-up to one or more of the target storages $104_1$, $104_2$ ... $104_m$.

Figure 2:
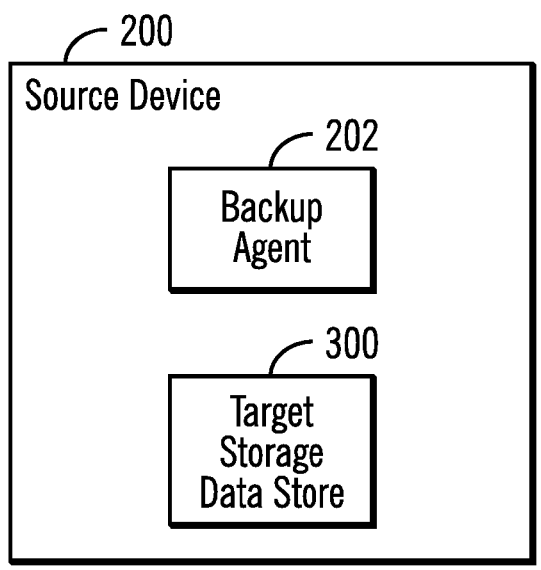
FIGS. 2 and 5 illustrate embodiments of a source device.

FIG. 2 illustrates an embodiment of the source device 200, such as source devices $200_1$, $200_2$ ... $200_n$, as having a backup agent 202 executing in the source device 200 to select target storages $104_1$, $104_2$ ... $104_m$ to use to backup the source data 108 at the source device 200. The backup agent 202 accesses information in a target storage data store 300, having information on the target storages $104_1$, $104_2$ ... $104_m$, that is used to select one or more of the target storages $104_1$, $104_2$ ... $104_m$.

In one embodiment, the backup agent 202 may comprise a program downloaded from a web site, and the target storage data store 300 may be included in the download as a self-contained look-up table. In such case, the backup agent 202 may rely on the information in the provided target storage data store 300. Alternatively, the backup agent 202 may update the target storage data store 300 by downloading a current version from a remote web site having current target storage information. In a further embodiment, the backup agent 202 may obtain the target storage data store 300 from a remote server. In yet a further embodiment, the backup agent 202 may populate the target storage data store 300 by communicating with the target storages $104_1$, $104_2$ ... $104_m$ over the network 106.

In one embodiment, the target storage data store 300 may comprise a look-up table. The target storage data store 300 may also comprise a common data store such as Lightweight Directory Access Protocol (LDAP) data store or an Active Directory service.

In the above described embodiments, the backup agent 202 is located within the source device 200 for which a target storage is to be selected. In an alternative embodiment, the backup agent 202 may be located in a separate network device from the source device 200, such as in a remote server or gateway server that manages backup storage provisioning for multiple of the source devices $200_1$, $200_2$ ... $200_n$.

A source device $200_1$, $200_2$ ... $200_n$ may have storage allocated to function as a target storage for other source devices and a target storage may have storage allocated for a source device as well as storage allocations for one or more target storage instances. One server may host multiple virtual target storages and virtual source devices. Further, the target storages $104_1$, $104_2$ ... $104_m$ may include a controller to provide access and management services over the network 106.

The source devices $200_1$, $200_2$ ... $200_n$ and target storages $104_1$, $104_2$ ... $104_m$ may comprise an enterprise storage controller/server suitable for managing access to attached storage devices. Alternatively, the source devices $200_1$, $200_2$ ... $200_n$ may comprise client devices or may comprise different types of computing systems, such as enterprise storage servers, workstations, mainframes, mobile computing devices, personal computers, tablets, smartphones, portable computing devices, telephony, wearable computers, where different source devices $200_1$, $200_2$ ... $200_n$ may comprise the same or different types of computing devices.

The network 106 may comprise a Storage Area Network (SAN), Local Area Network (LAN), Intranet, the Internet, Wide Area Network (WAN), peer-to-peer network, wireless network, arbitrated loop network, etc. The storages $104_1$, $104_2$ ... $104_m$ and 110 may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices in which the storages $104_1$, $104_2$ ... $104_m$ and 110 are implemented may comprise hard disk drives, solid state drives (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. In further embodiments, one or more of the storages $104_1$, $104_2$ ... $104_m$ and 110 may comprise a storage environment, such as a software defined storage, virtual storage, cloud provisioned storage, etc.

Figure 3:
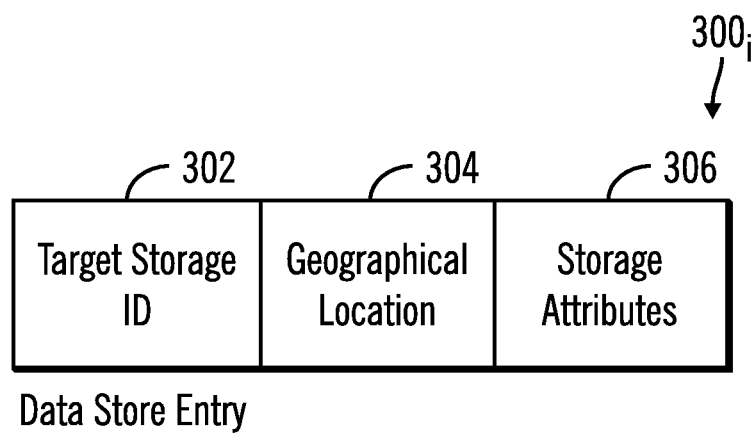
FIG. 3 illustrates an embodiment of a target storage data store entry.

FIG. 3 illustrates an embodiment of an instance of a data store entry 300, in the data store 300 for each of the target storages $104_1$, $104_2$ ... $104_m$ including a target storage ID 302 identifying the target storage; a geographical location 304 of the target storage 302; and storage attributes 306 providing information on the target storage 302, such as a type of storage device, e.g., SSD, disk, tape, etc.; a quality of service level; a network connection rate, storage capacity/rate, and other possible storage characteristics or attributes that are used to select an appropriate target storage.

Figure 4:
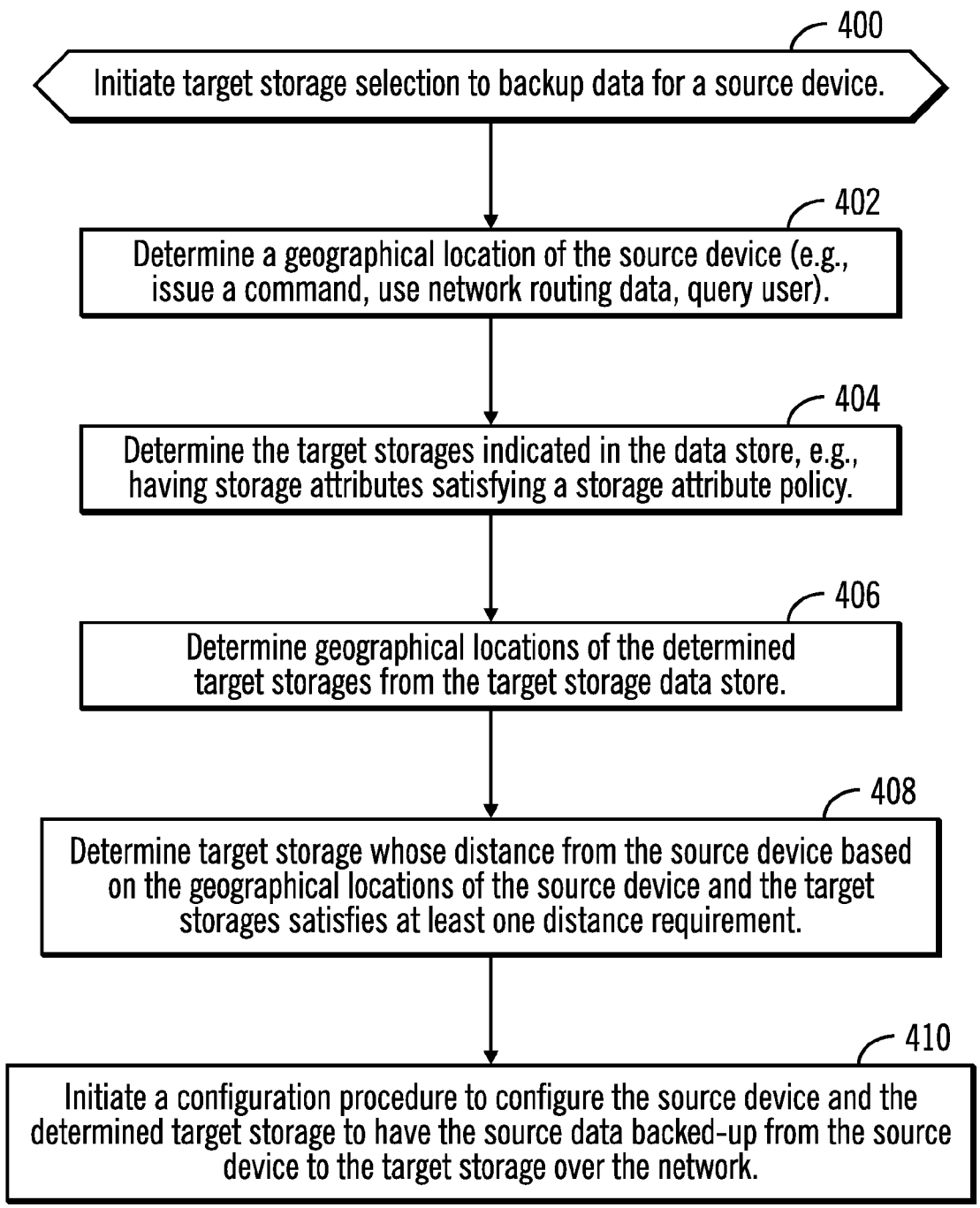
FIG. 4 illustrates an embodiment of operations to select a target storage to backup source data from a source device.

FIG. 4 illustrates an embodiment of operations performed by the backup agent 202 to provision a target storage $104_1$, $104_2$ ... $104_m$ for a source device 200, such as one of the source devices $200_1$, $200_2$ ... $200_n$. Upon receiving (at block 400) a request to provision backup resources, the backup agent 202 determines (at block 402) a geographical location of the source device 200. If the source device 200 is a mobile device, then its geographical location may change frequently. In one embodiment, the backup agent 202 may determine the geographical location of the source device 200 by issuing a command to an operating system of the source device 200 to obtain the geographical location if the source device 200 has a Global Positioning System (GPS) component to provide an exact location. In a further embodiment, the backup agent 202 may use network routing data to estimate the geographical location of the source device 200, such as by sending pings to known locations, using internet speed check tools to establish location using routing data, performing triangulation with network hops from the device to known servers, etc. In a yet further embodiment, the backup agent 202 may interact with a user of the source device 200, such as by rendering a user interface window on a display or through voice commands, to request a user of the source device 200 to input the geographical location of the source device 200.

The backup agent 202 further determines (at block 404) the target storages $104_1$, $104_2$ ... $104_m$ indicated in the data store 300. In one embodiment, the backup agent 202 may determine target storages $104_1$, $104_2$ ... $104_m$ that have storage attributes 306 in their data store entries 300, that satisfy storage attributes in backup policy settings for the source device 200, such as a quality of service level, storage throughput, network throughput, storage capacity, storage type, etc. In a further embodiment, the backup agent 202 may not narrow the set of available target storages $104_1$, $104_2 \ldots 104_m$ according to storage attributes, and instead just consider all target storages $104_1, 104_2 \ldots 104_m$ indicated in the data store 300.

The backup agent 202 determines (at block 406) the geographical locations 304 of the determined target storages $104_1, 104_2 \ldots 104_m$ from the target server data store 300. The backup agent 202 then determines (at block 408) the target storage 104 whose distance from the source device 200 satisfies at least one distance requirement. In one embodiment, there may be only one distance requirement which specifies a minimum distance that the target storage must be from the source device 200, such as a disaster impact diameter (DID) indicating a minimum distance to backup the data to protect from an area wide disaster. There may be just one disaster impact diameter used for all target storages $104_1, 104_2 \ldots 104_m$ and the source device 200. Alternatively, the target storages $104_1, 104_2 \ldots 104_m$ and source device 200 may have different disaster impact diameters. In such case, the backup agent 202 would use the maximum disaster impact diameter of the target storage $104_1, 104_2 \ldots 104_m$ being considered and the source device 200.

In another embodiment, the distance requirement may comprise a primary distance limit to indicate a maximum distance for the target storage $104_1, 104_2 \ldots 104_m$ to be from the source device 200 to allow for sufficient throughput and transfer rates for everyday production backups and recoveries for the source device 200. In one embodiment, the primary distance limit may be a fixed distance. In a further embodiment, the primary distance limit may be determined by determining a maximum distance from the source device 200 that still provides for a minimum data throughput rate between a target storage at the maximum distance and the source device 200. This maximum PDL may be determined dynamically by the backup agent 202 whenever performing the operations of FIG. 4 to select target storages $104_1, 104_2 \ldots 104_m$, or may be a default value determined empirically and included as a default setting in the backup agent 202.

In a further embodiment, the at least one distance requirement may include both disaster impact diameter and a primary distance limit, such that the target storage $104_1, 104_2 \ldots 104_m$ is selected that has a distance from the source device 200 that exceeds the disaster impact diameter but is less than the primary distance limit. Target storages $104_1, 104_2 \ldots 104_m$ that do not satisfy this requirement are not selected. If there are multiple target storages $104_1, 104_2 \ldots 104_m$ that satisfy the one or more distance requirements, then the backup agent 202 may select the target storage closest to the source device 200. Upon selecting one of the target storage $104_1, 104_2 \ldots 104_m$, referred to as target storage 104, the backup agent 202 may initiate (at block 410) a configuration procedure to configure the source device 200 and the determined target storage $104_i$ to have the source data 108 backed-up from the source device 200 to the target storages $104_i$ over the network 106. In one embodiment, the backup agent 202 may issue commands to configure both the source device 200 and the selected target storage 104 to have the source data 108 backed up to the selected target storage 104. The backup agent 202 can use Application Programming Interfaces (APIs) or other remote configuration tools, such as Tivoli® Remote Execution and Access (RXA) toolkit, to configure the selected target storage 104 and the source device 200 for the backup operations. (TIVOLI is a registered trademark of International Business Machines Corporation throughout the world). In an alternative embodiment, the backup agent 202 may report the configuration information to a storage administrator who would then manually configure the source device 200 and the selected target storage for the backup operations.

If there are no target storages $104_1, 104_2 \ldots 104_m$ that satisfy the one or more distance requirements, then the backup agent 202 may report an error message to the administrator. Alternatively, the backup agent 202 may select a closest target storage 104 to provide backup services for the source device 200 and generate a message noting that selection was made without satisfying the distance requirements.

Figure 5:
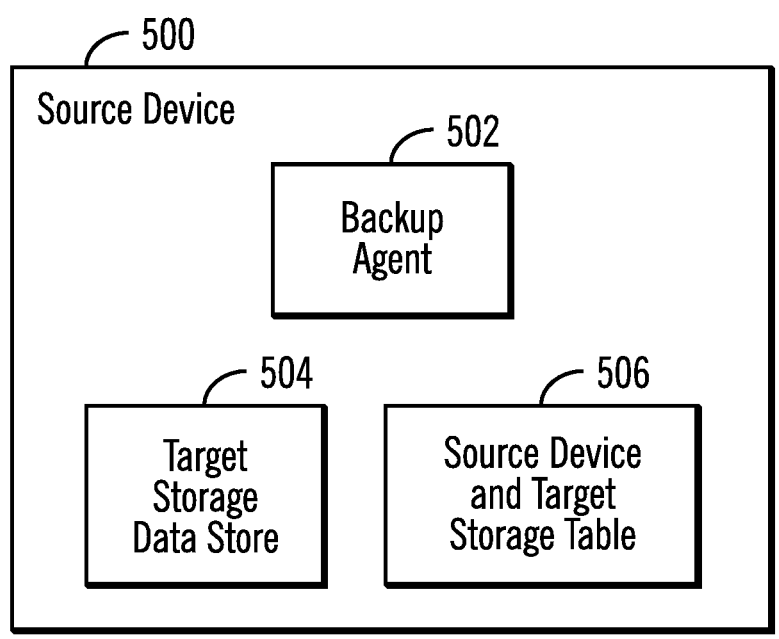

FIG. 5 illustrates an additional embodiment of the source device 500, such as may be used with the source devices $200_1, 200_2 \ldots 200_n$ having a backup agent 502 to select one or more target storages $104_1, 104_2 \ldots 104_m$ on which to backup data, a target storage data store 504, such as the target storage data store 300, and a source device and target storage table 506 having information on distances between the source device 500 being configured and each of the target storages $104_1, 104_2 \ldots 104_m$ and distances from each target storage to each other target storage.

Figure 6B:
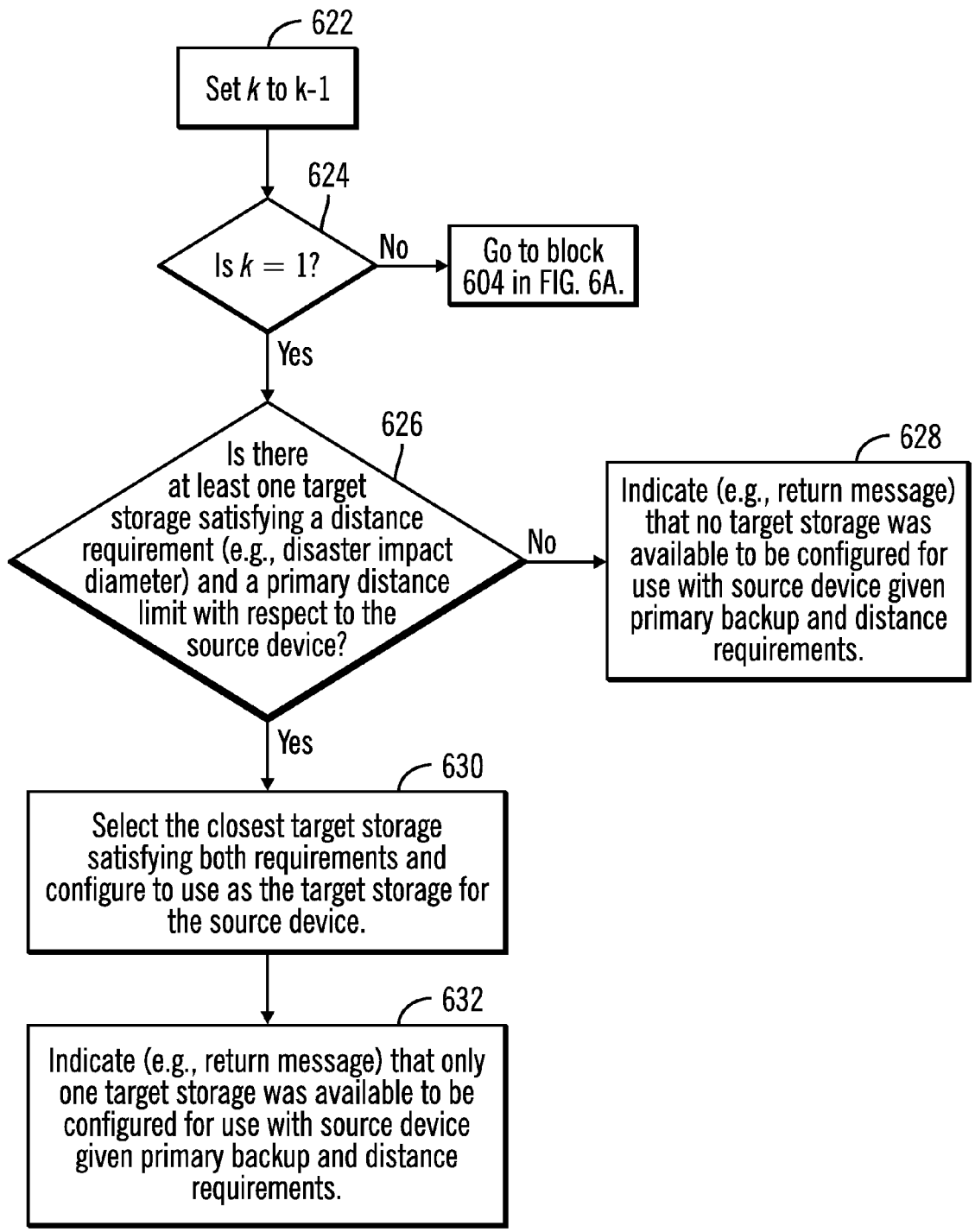
Figure 6C:
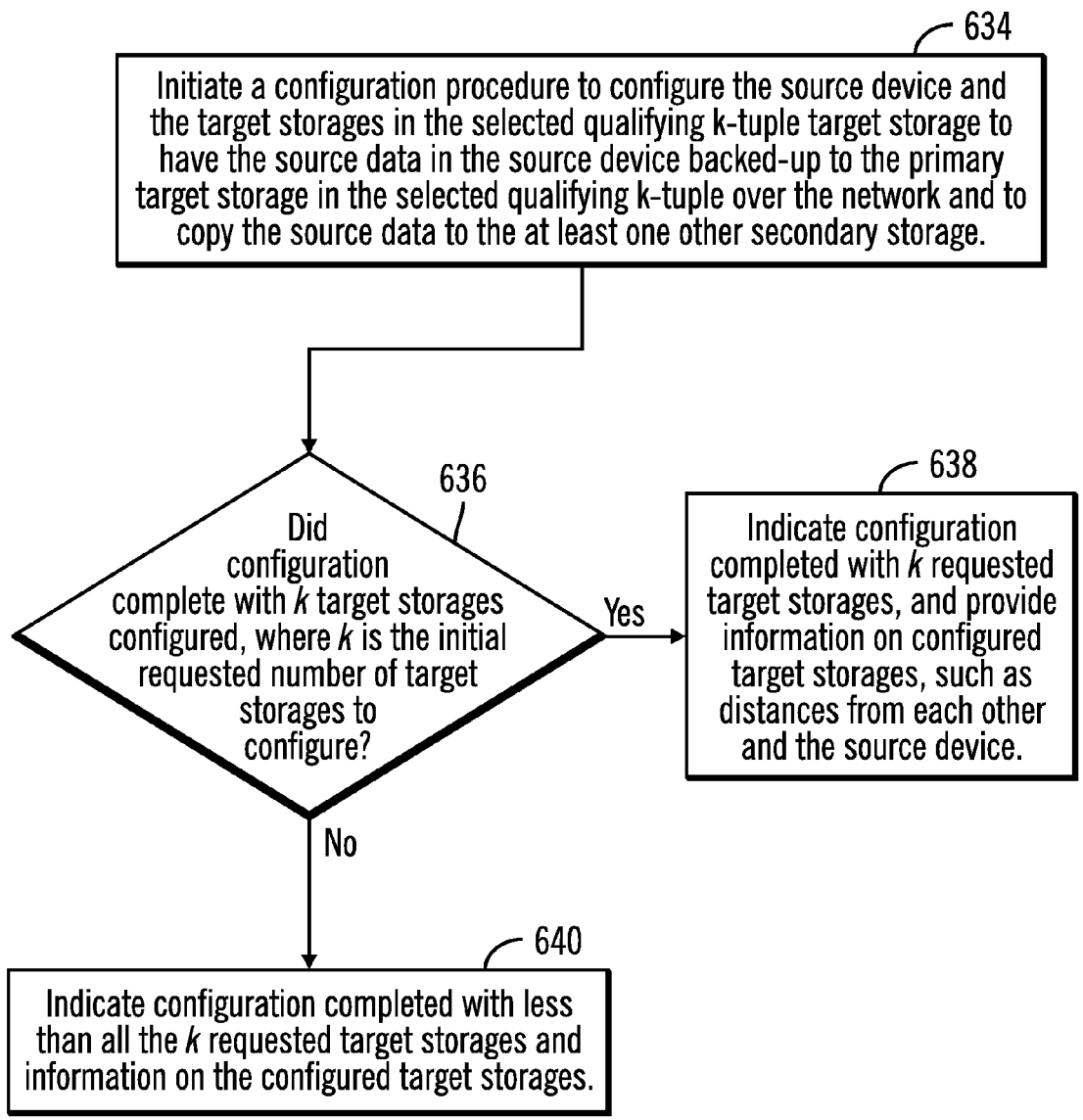

FIGS. 6a, 6b, and 6c illustrate an embodiment of operations performed by the backup agent 502 to determine a set of k target storages of the m possible target storages $104_1, 104_2 \ldots 104_m$, where one of the k target storages comprises a primary backup storage and the other of the k target storages comprise secondary backup storages. The variable "k" may comprise any positive integer less than or equal to m. Initially, k may have to be greater than or equal to two, but later may be decremented to one. The backup agent 502 may generate or receive a request to configure k target storages. Upon initiating (at block 600) an operation to determine k target storages of the target storages $104_1, 104_2 \ldots 104_m$, the backup agent 502 determines (at block 602) a geographical location of the source device 500, e.g., by issuing a command to the source device operating system, using network routing information, querying the user, etc. The backup agent 502 determines (at block 604) a geographical distance between the source device 500 and each of the target storages $104_1, 104_2 \ldots 104_m$ and between each pair of target storages $104_1, 104_2 \ldots 104_m$. This information may be maintained in the source device and target storage table 506, which may be part of the installed backup agent 502, downloaded from a remote server, or determined by querying the target storages $104_1, 104_2 \ldots 104_m$ in the network 106.

The backup agent 502 then determines (at block 606) qualifying k-tuples of the target storages $104_1, 104_2 \ldots 104_m$ that have one target storage satisfying a distance requirement (e.g., disaster impact diameter) and a primary distance limit, such as described above, with respect to the source device 500 and that a distance between any two target storages in the k-tuple satisfies the distance requirement (e.g. disaster impact diameter). The k-tuple comprises a grouping of k elements, or in the described embodiments, target storages that as a whole satisfy the distance requirements applied by the backup agent 502. In one embodiment, the primary distance limit provides a distance limit to ensure a high level of throughput between the source device 500 and one of the target storages in the k-tuple. In one embodiment, the same distance requirement, e.g., disaster impact diameter, may be used for the source device 500 and the target storages $104_1, 104_2 \ldots 104_m$. In a further embodiment, the source device 500 and the target storages $104_1, 104_2 \ldots 104_m$ may have different distance requirements, such that the distance requirements for each pair of devices, source device 500 and target storages $104_1$, $104_2$ . . . $104_m$, must both be satisfied by each of the devices being compared in order to be a qualifying k-tuple.

In the above embodiment, a qualifying k-tuple has k target storages, with one target storage satisfying two requirements, e.g., disaster impact diameter and primary distance limit, with respect to the source device 500, and each pair of the k target storages satisfying a distance requirement for the k target storages, such as a disaster impact diameter. In an alternative embodiment, a qualifying k-tuple may satisfy a different set of requirements. For instance, a qualifying k-tuple may have target storages that satisfy the distance requirement, e.g., disaster impact diameter, between each pair of target storages, but not have to satisfy the requirements with respect to the source device 500. In alternative embodiments, different tests may be used for the target storages or the target storages and the source device to determine a qualifying k-tuple.

If (from the yes branch of block 608 and the yes branch of block 610) there is only one qualifying k-tuple, then that qualifying single k-tuple is selected (at block 612). If (from the yes branch of block 608 and the no branch of block 610) there are multiple qualifying k-tuples, then the backup agent 502 determines (at block 614) a score of each of the qualifying k-tuples based on a distance between each of the target storages in the k-tuple from the source device 500. A "better" score may comprise a score indicating less total distance between the k target storages and the source device 500. In an alternative embodiment, different criteria may be used to score the k-tuples, such as distance between the k target storages, throughput, geographical preferences (e.g., within a country, international, etc.). The backup agent 502 then selects (at block 616) the qualifying k-tuple having a "best" score, which may be a lowest or highest score depending on the criteria.

After selecting a qualifying k-tuple at block 612 or block 616, the backup agent 502 may then designate (at block 618) the target storage of the selected k-tuple closest to the source device 500 as a primary target storage to which the source data from the source device is backed-up and designate (at block 620) the other at least one target storage of the selected k-tuple not closest to the source device as at least one secondary target storage to which the source data is backed-up from at least one of the other target storages in the selected k-tuple. For instance, once the source data 108 is backed-up to the primary target storage $104_1$, the backed-up source data 108 from the primary target storage $104_1$ may be copied to one of the secondary target storages, and each secondary storage $104_i$ to which the source data 108 is copied selects another one of the secondary target storages $104_{(i+1)}$ to which the source data 106 is further copied. Each target storage $104_i$ may select the closest other target storage $104_{(i+1)}$ to which to copy the source data 108 until the source data 106 resides on all the target storages in the selected k-tuple. Alternatively, the primary target storage $104_1$ may copy the source data 108 to all the target storages $104_2$ . . . $104_k$. In a yet further embodiment, the source device 500 may copy the source data 108 to all the k target storages in the selected k-tuple.

If (at block 608) there was no qualifying k-tuple having a set of k target storages satisfying the distance (e.g., disaster impact diameter) and/or primary distance limit, then control proceeds to block 622 in FIG. 6b to try to find a (k−1) tuple of (k−1) target storages that satisfy the distance and other requirements. At block 622, k is decremented. If (at block 624) k is not equal to one, then control proceeds to block 604 in FIG. 6a to try to find a qualifying (k−1) tuple of target storages to provision. If (at block 624) k has been decremented to one and if (at block 626) there is at least one target storage server satisfying a distance requirement (e.g., disaster impact diameter) and/or a primary distance limitation (PDL) requirement, such as the same requirements considered at block 604 with respect to the source device 500, then the backup agent 502 selects (at block 630) the closest target storage satisfying the requirements (e.g., disaster impact diameter and/or primary distance limit) with respect to the source device to provision as the target storage. After selecting only one target storage $104i$ to use, the backup agent 502 indicates (at block 632) that only one target storage was available to be configured for use with source device 500 given the different distance requirements. This indication may be provided in a message to an administrator of the outcome. If (at block 626) there was not one target storage satisfying the requirements, then the backup agent 502 indicates (at block 628) (e.g., returns a message) that no target storage $104_1$, $104_2$ . . . $104_m$ was available to be configured for use with source device given distance requirements.

After designating (at blocks 618 and 620) the primary and secondary target storages, control proceeds to block 634 in FIG. 6c where the backup agent 502 initiates a configuration procedure to configure the source device 500 and the k target storages in the selected qualifying k-tuple target storage to have the source data 108 in the source device 500 backed-up to the primary target storage in the selected qualifying k-tuple over the network 106 and copy the source data 108 to the at least one other secondary target storage. In one embodiment, the backup agent 502 may automatically issue APIs and other commands to configure the source device 500 and the k target storages to backup the source data 108. In an alternative embodiment, the backup agent 502 may provide information on the selected k target storages to an administrator or other program to have another entity perform the actual configuration.

If (at block 636) the configuration (or indication of the configuration) completed with all the initial k requested target storages, then the backup agent 502 indicates (at block 638) that the configuration successfully completed with the k requested target storages, and provides information on configured target storages, such as distances from each other and the source device. If (at block 636) the configuration completed with less than the requested k target storages, then the backup agent 502 indicates (at block 640) that the configuration completed with less than the requested k target storages and information on the configured target storages.

The determination of qualifying k-tuples in FIGS. 6a, 6b, and 6c may also be used for other types of network determinations, such as where to locate a new target storage, source device, or from which location to remove a target storage.

Figure 7:
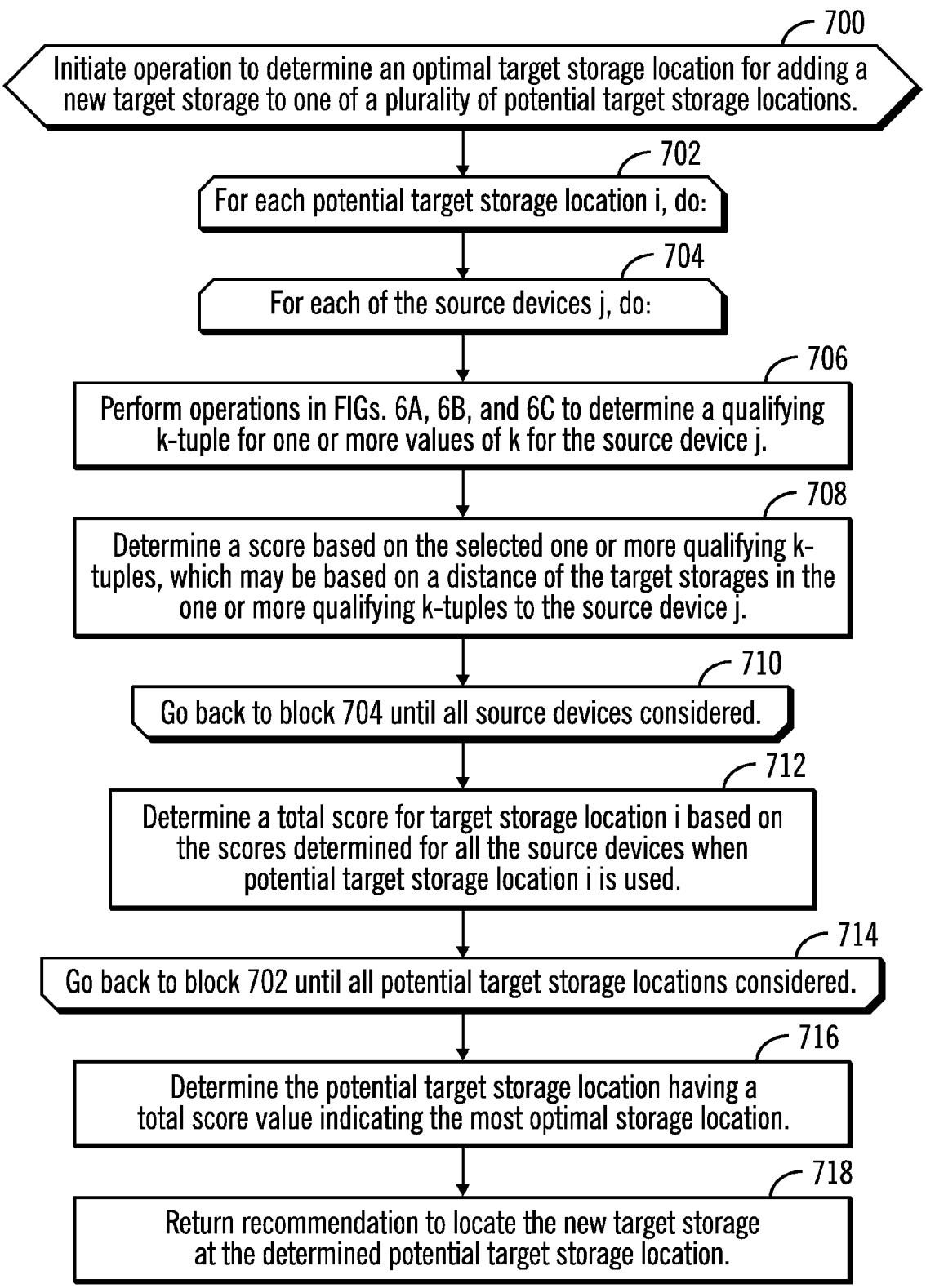
FIG. 7 illustrates an embodiment of operations to optimally select a target storage location of a plurality of potential target storage locations at which to provide a new target storage.

FIG. 7 illustrates an embodiment of operations performed by the backup agent 502 (or 202) or another program to use the operations of FIGS. 6a, 6b, and 6c to determine an optimal storage location to use for adding a new target storage to one of a plurality of potential target storage locations. In other words, the described operations of FIGS. 6a, 6b, and 6c may be used for purposes other than provisioning storage to clients, but may also be used to optimize placement of new target storages. Upon initiating (at block 700) the operations to optimize placement of a new target storage, the backup agent 502 performs a loop of operations at blocks 702 through 714 for each potential target storage location i being considered, which comprises a geographical location. A loop of operations is then performed from blocks 704 through 710 for each of the source devices j configured in the network 106.

At block 706, the backup agent 502 performs the operations in FIGS. 6a, 6b, and 6c to determine a qualifying k-tuple for one or more values of k for the source device j. The backup agent 502 then determines (at block 708) a score based on the selected one or more qualifying k-tuples, which may be based on a distance of the target storages in the one or more qualifying k-tuples to the source device. The backup agent 502 determines (at block 712) a total score for target storage location i based on the scores determined for all the source devices at block 708 when the potential target storage location i was added to the mix of target storages, such as by adding the new target storage to the target storage data store 504 and source device and target storage table 506.

In this way the optimization considers how a potential storage location i optimizes selection across each of the source devices $200_1, 200_2 \ldots 200_n$ in the network 106 by determining a score for each of the potential storage locations based on the geographical location of the source devices $200_1, 200_2 \ldots 200_n$ that will be impacted by the placement. After determining the total scores for all the potential target storage locations, the backup agent 502 determines (at block 716) the potential target storage location having a total score value indicating the most optimal storage location. This most optimal potential target storage location is returned (at block 718) in a recommendation of where to locate the new target storage.

In a further embodiment, if a target storage needs to be removed the operations of FIG. 7 may be used to determine an optimal possible location from which to remove a target storage by considering the location of all the existing target storages $104_1, 104_2 \ldots 104_m$ as the potential target storage locations for removal. Further, the logic of FIG. 7 may also be used to determine an optimal location to locate a source device $200_1, 200_2 \ldots 200_n$ or to determine the effect of using different distance and primary distance limit requirements.

Described embodiments provide techniques to provision target storages to a source device based on the location of the source device and the target storage and one or more distance requirements, such as a disaster impact diameter and/or a primary distance limit for the source device. The described operations are particularly useful in situations where the source device may be moved or located in different geographical locations, and the set of qualifying target storages may be changed. With the described embodiments, the selected target storage may be automatically configured to backup selected source data from the source device.

Further embodiments provide techniques to select a specified number of target storages to provision to provide data protection to a storage device considering the geographical locations of the source device and the target storages with respect to each other. With described embodiments a group or tuple of target storages having the specified number is selected that satisfy distance and primary distance limit criteria with respect to the source device. Further, the technique for selecting a best or optimal allocation of specified target servers based on the geographical locations of the target server and the storage device may be used to select an optimal potential target storage location at which to provide a new target storage when determining where to allocate new target storage resources.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i, j, k, m, n, used to designate a number of instances of an element may indicate a variable number of instances of that element when used with the same or different elements.

The computational components of FIGS. 1, 2, and 5 including the source devices $200_1$, $200_2$ ... $200_n$, 200, 500 and target storages $104_1$, $104_2$ ... $104_m$ may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

Figure 8:
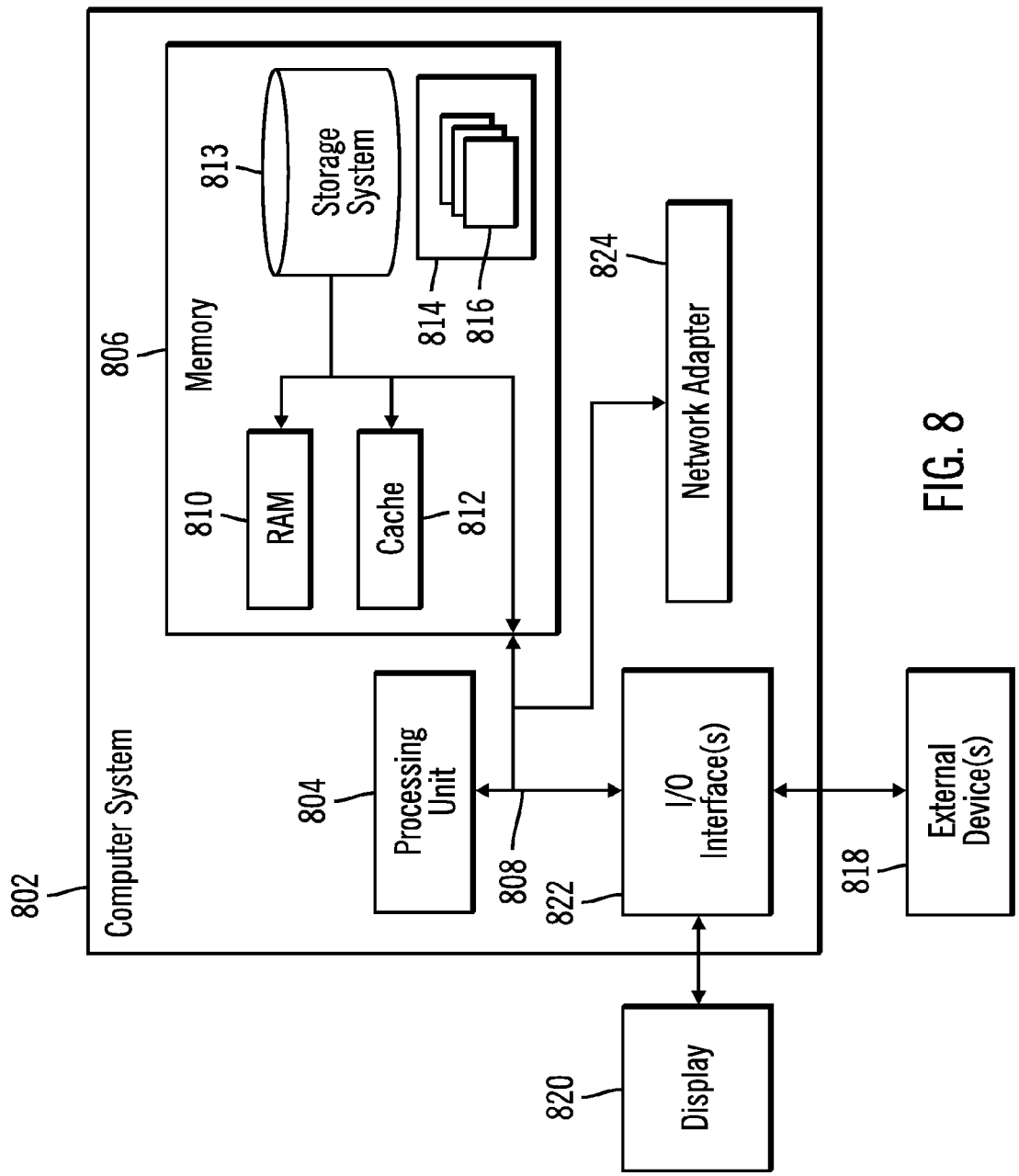
FIG. 8 illustrates a computing environment in which the components of FIGS. 1, 2, and 5 may be implemented.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components may be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for selecting target storages to backup source data from a source device in a network comprising a plurality of m target storages, wherein the computer program product comprises at least one computer readable storage medium including computer readable code embodied therewith that when executed by a processor performs operations, the operations comprising:

determining a geographical location of the source device;

determining a distance between the source device and each of the target storages and between each pair of target storages;

determining qualifying k-tuples of the target storages, wherein each k-tuple comprises a group of k target storages to which the source data is to be backed-up, wherein k is an integer value greater than or equal to two and less than or equal to m, wherein a qualifying k-tuple has one target storage that satisfies a distance requirement with respect to the source device and wherein a distance between any two target storages in the qualifying k-tuple satisfies the distance requirement;

in response to determining that there is no k-tuple that has target storages that satisfy the distance requirement with respect to the source device and the target storages in the k-tuple, determining qualifying (k−1)-tuples of the target storages, wherein each k−1 tuple comprises a group of k−1 target storages, wherein a qualifying (k−1)-tuple has a first target storage that satisfies a distance requirement with respect to the source device and wherein a distance between any two target storages in the qualifying (k−1)-tuple satisfies the distance requirement;

selecting one of the qualifying k-tuples and (k−1)-tuples; and indicating the selected qualifying k-tuple or (k−1)-tuple to use to backup the source data at the k or k−1 target storages in the qualifying k-tuple or (k−1)-tuple.

2. The computer program product of claim 1, wherein the operations further comprise:

initiating a configuration procedure to configure the source device and the target storages in the selected qualifying k-tuple target storages to have the source data in the source device backed-up to the target storages in the selected qualifying k-tuple over the network.

3. The computer program product of claim 1, wherein the distance requirement comprises a disaster impact diameter, wherein each of the qualifying k-tuples has no target storages whose distance from any other target storage is less than the disaster impact diameter.

4. The computer program product of claim 3, wherein the source device and each of the target storages have a disaster impact diameter, wherein at least two of the disaster impact diameters of the source device and each of the target storages are different.

5. The computer program product of claim 1, wherein the operations further comprise:

determining a score of each of the qualifying k-tuples based on a distance between the target storages in the k-tuple, wherein the selected qualifying k-tuple has a best score of the scores of the k-tuples indicating a most optimal of the target storages.

6. The computer program product of claim 5, wherein the score of each of the k-tuples is based on a distance of each of the target storages in the k-tuple to the source device.

7. The computer program product of claim 1 wherein the selected one of the qualifying k-tuples has one target storage closer to the source device than all the target storages in all other qualifying k-tuples.

8. The computer program product of claim 1, wherein each of the qualifying k-tuples includes at least one target storage satisfying a primary distance limit with respect to the source device.

9. The computer program product of claim 8, wherein the primary distance limit indicates a data throughput rate threshold, wherein the operations further comprise:
performing a measurement test on a network connection between the source device and each of the target storages to determine measured data throughput rates between the source device and the target storages, where the primary distance limit indicates a maximum distance at which a minimum throughput level can be provided.

10. The computer program product of claim 1, wherein the operations further comprise:
designating the target storage of the selected k-tuple closest to the source device as a primary target storage to which the source data from the source device is backed-up; and
designating at least one target storage of the selected k-tuple not closest to the source device as at least one secondary target storage to which the source data is backed-up from at least one other of the target storages in the selected k-tuple.

11. The computer program product of claim 1, wherein the operations further comprise:
receiving a request to determine an optimal target storage location for adding a new target storage to one of a plurality of potential target storage locations;
for each of the potential target storage locations, performing:
for each of a plurality of source devices having source data to backup in the network, performing the operations of determining the geographical location of the source device, determining a distance between the source device and each of the m target storages including the new target storage at the potential target storage location, determining, qualifying k-tuples, and selecting one of the qualifying k-tuples; and
determining a score based on the selected qualifying k-tuples including the potential target storage location for the source devices; and
selecting one of the potential target storage locations for locating the new target storage having the score indicating an optimal location for the new target storage.

12. A system for selecting target storages to backup source data from a source device in a network comprising a plurality of m target storages, comprising:
a processor; and
a computer readable storage medium having program instruction that when executed perform operations, the operations comprising:
determining a geographical location of the source device;
determining a distance between the source device and each of the target storages and between each pair of target storages;
determining qualifying k-tuples of the target storages, wherein each k-tuple comprises a group of k target storages to which the source data is to be backed-up, wherein k is an integer value greater than or equal to two and less than or equal to m, wherein a qualifying k-tuple has one target storage that satisfies a distance requirement with respect to the source device and wherein a distance between any two target storages in the qualifying k-tuple satisfies the distance requirement;
in response to determining that there is no k-tuple that has target storages that satisfy the distance requirement with respect to the source device and the target storages in the k-tuple, determining qualifying (k−1)-tuples of the target storages, wherein each k−1 tuple comprises a group of k−1 target storages, wherein a qualifying (k−1)-tuple has a first target storage that satisfies a distance requirement with respect to the source device and wherein a distance between any two target storages in the qualifying (k−1)-tuple satisfies the distance requirement;
selecting one of the qualifying k-tuples and (k−1)-tuples; and
indicating the selected qualifying k-tuple or (k−1)-tuple to use to backup the source data at the k or k−1 target storages in the qualifying k-tuple or (k−1)-tuple.

13. The system of claim 12, wherein the operations further comprise:
determining a score of each of the qualifying k-tuples based on a distance between the target storages in the k-tuple, wherein the selected qualifying k-tuple has a best score of the scores of the k-tuples indicating a most optimal of the target storages.

14. The system of claim 13, wherein the score of each of the k-tuples is based on a distance of each of the target storages in the k-tuple to the source device.

15. The system of claim 12, wherein each of the qualifying k-tuples includes at least one target storage satisfying a primary distance limit with respect to the source device.

16. The system of claim 12, wherein the operations further comprise:
receiving a request to determine an optimal target storage location for adding a new target storage to one of a plurality of potential target storage locations;
for each of the potential target storage locations, performing:
for each of a plurality of source devices having source data to backup in the network, performing the operations of determining the geographical location of the source device, determining a distance between the source device and each of the m target storages including the new target storage at the potential target storage location, determining, qualifying k-tuples, and selecting one of the qualifying k-tuples; and
determining a score based on the selected qualifying k-tuples including the potential target storage location for the source devices; and
selecting one of the potential target storage locations for locating the new target storage having the score indicating an optimal location for the new target storage.

17. The system of claim 12, wherein the operations further comprise:
  initiating a configuration procedure to configure the source device and the target storages in the selected qualifying k-tuple target storages to have the source data in the source device backed-up to the target storages in the selected qualifying k-tuple over the network.

18. The system of claim 12, wherein the distance requirement comprises a disaster impact diameter, wherein each of the qualifying k-tuples has no target storages whose distance from any other target storage is less than the disaster impact diameter.

19. The system of claim 18, wherein the source device and each of the target storages have a disaster impact diameter, wherein at least two of the disaster impact diameters of the source device and each of the target storages are different.

20. The system of claim 12, wherein the selected one of the qualifying k-tuples has one target storage closer to the source device than all the target storages in all the other qualifying k-tuples.

21. The system of claim 20, wherein a primary distance limit indicates a data throughput rate threshold, wherein the operations further comprise:
  performing a measurement test on a network connection between the source device and each of the target storages to determine measured data throughput rates between the source device and the target storages, where the primary distance limit indicates a maximum distance at which a minimum throughput level can be provided.

22. The system of claim 12, wherein the operations further comprise:
  designating the target storage of the selected k-tuple closest to the source device as a primary target storage to which the source data from the source device is backed-up; and
  designating at least one target storage of the selected k-tuple not closest to the source device as at least one secondary target storage to which the source data is backed-up from at least one of the other target storages in the selected k-tuple.

* * * * *